United States Patent
Bergman et al.

(10) Patent No.: US 7,382,770 B2
(45) Date of Patent: Jun. 3, 2008

(54) MULTI-MODAL CONTENT AND AUTOMATIC SPEECH RECOGNITION IN WIRELESS TELECOMMUNICATION SYSTEMS

(75) Inventors: Janne Bergman, Tampere (FI); Pekka Kapanen, Pirkkala (FI)

(73) Assignee: Nokia Corporation, Espoo (FI)

( * ) Notice: Subject to any disclaimer, the term of this patent is extended or adjusted under 35 U.S.C. 154(b) by 1172 days.

(21) Appl. No.: 10/374,262

(22) Filed: Feb. 27, 2003

(65) Prior Publication Data

US 2003/0161298 A1 Aug. 28, 2003

Related U.S. Application Data

(63) Continuation of application No. PCT/FI01/00700, filed on Aug. 8, 2001.

(30) Foreign Application Priority Data

Aug. 30, 2000 (FI) ................................. 20001918

(51) Int. Cl.
*H04L 12/66* (2006.01)
(52) U.S. Cl. ........................ 370/352; 370/389; 370/401; 704/270.1; 379/88.16
(58) Field of Classification Search ................ 370/352, 370/329, 401, 338, 349, 357, 389, 400; 709/219, 709/203, 229; 719/328; 455/563; 379/88.16; 704/270.1, 251
See application file for complete search history.

(56) References Cited

U.S. PATENT DOCUMENTS 5,497,373 A 3/1996 Hulen

| | | | |
|---|---|---|---|
| 6,336,137 B1* | 1/2002 | Lee et al. | 709/219 |
| 6,757,655 B1* | 6/2004 | Besling et al. | 704/270.1 |
| 6,757,734 B1* | 6/2004 | Resenius et al. | 709/230 |
| 6,804,330 B1* | 10/2004 | Jones et al. | 379/88.01 |

(Continued)

FOREIGN PATENT DOCUMENTS

EP 0 872 827 A3 4/1999

(Continued)

OTHER PUBLICATIONS

"Voice Enabled Request And Response For Mobile Devices Supporting WAP Protocol: The Constraints"Moban, et al., IEEE, 2000, pp. 185-194.

*Primary Examiner*—Chi Pham
*Assistant Examiner*—Alexander O. Boakye
(74) *Attorney, Agent, or Firm*—Banner & Witcoff, Ltd

(57) ABSTRACT

A communication architecture for delivery of grammar and speech related information such as text-to-speech (TTS) data to a speech recognition server operating with a wireless telecommunication system for use with automatic speech recognition and interactive voice-based applications. In the invention, a mobile client retrieves a Web page containing multi-modal content hosted on a origin server via WAP gateway. The content may include a grammar file and/or TTS strings embedded in the content or reference URL(s) pointing to their storage locations. The client then sends the grammar and/or TTS strings to a speech recognition server via a wireless packet streaming protocol channel. When URL(s) are received by the client and sent to the SRS, the grammar file and/or TTS strings are obtained via a high speed HTTP connection. The speech processing results and the synthesized speech are returned to the client over the established wireless UDP connection.

15 Claims, 5 Drawing Sheets

U.S. PATENT DOCUMENTS 6,823,373 B1 * 11/2004 Pancha et al. ............... 709/219
7,092,370 B2 * 8/2006 Jiang et al. ................. 370/329

FOREIGN PATENT DOCUMENTS

| EP | 1 104 155 A2 | 5/2001 |
| WO | WO 99/48088 A1 | 9/1999 |
| WO | WO 00/23985 A1 | 4/2000 |
| WO | WO 00/67091 A2 | 11/2000 |
| WO | WO 01/28187 A1 | 4/2001 |
| WO | WO 01/43024 A1 | 6/2001 |

* cited by examiner

MULTI-MODAL CONTENT AND AUTOMATIC SPEECH RECOGNITION IN WIRELESS TELECOMMUNICATION SYSTEMS

This application is a continuation of international application number PCT/FI01/00700, filed Aug. 8, 2001.

FIELD OF INVENTION

The present invention relates generally to wireless telecommunication systems and, more particularly, to a method and system for automatic speech recognition and the reception and playback of multi-modal content on mobile clients.

BACKGROUND OF THE INVENTION

The tremendous growth of the Internet over the years demonstrates that users value the convenience of being able to access the wealth of information available online and that portion of the Internet comprising the World Wide Web (WWW). The Internet has proven to be an easy and effective way to deliver services such as banking etc. to multitudes of computer users. Accordingly, Internet content and the number of services provided thereon have increased dramatically and is projected to continue to do so for many years. As the Internet becomes increasingly prevalent throughout the world, more and more people are coming to rely on the medium as a necessary part of their daily lives. Presently, the majority of people typically access the Internet with a personal computer using a browser such as Netscape Navigator™ or Microsoft Internet Explorer™. One disadvantage with this paradigm is that the desktop user is typically physically "wired" to the Internet thereby rendering the users' experience stationary.

Another industry that is experiencing rapid growth is in the area of mobile telephony. The number of mobile users is expected to grow substantially and, by many estimates will, if not already, outnumber the users of the traditional Internet. The large numbers of current and projected mobile subscribers has created a desire to bring the benefits of the Internet to the mobile world. Such benefits include being able to access the content now readily available on the Internet in addition to the ability to access a multitude of services available such as e.g. banking, placing stock trades, making airline reservations, and shopping etc. A further impetus arrives in the fact that adding to the attraction of providing such services is not lost on the mobile operators since significant potential revenues may be gained from the introduction of a whole host of new value-added services.

Operating in a wireless environment poses a number of constraints when bringing services to mobile subscribers as compared to the desktop experience. By way of example, mobile clients typically operate in low-bandwidth environments where there are typically limited amounts of spectral resources available for data transmission. It should be noted that use of the term mobile clients herein may include portable devices such as e.g. mobile phones, handheld devices such as personal digital assistants (PDAs), and communicator devices such as the Nokia 9110 and its successors etc. The low-bandwidth constraint renders traditional Internet browsing to be far too data intensive to be suitable for use with mobile clients and therefore alternative access solutions have been proposed.

One proposed solution to link the Internet for seamless viewing and use with mobile clients is Wireless Application Protocol (WAP). WAP is an open standard for mobile clients that, although being similar in operation to the well-known Internet technology, is optimized to meet the constraints of the wireless environment. This is achieved, among other things, by using a type of binary data transmission to optimize for long latency and low bandwidth in the form of wireless markup language (WML) and WML script. WML and WML script are optimized for use in hand-held mobile clients for producing and viewing WAP content and are analogous to the Hypertext Markup Language (HTML) and Java script used for producing and displaying content on the WWW.

FIG. 1 shows the basic architecture of a typical WAP service model which allows content to be hosted on WWW origin servers or WAP servers that are available for wireless retrieval by the client. By way of example, a WAP compliant client 100 containing a relatively simple built-in micro-browser is able to access the Internet via a WAP gateway 120 installed in a mobile phone network, for example. To access content from the WWW, a WAP client 100 may make a wireless WML request 110 to the WAP gateway 120 by specifying an uniform resource locator (URL) via transmission link 130 on an Internet origin server 140. A URL uniquely identifies a resource, e.g., a Web page or a document on an Internet server that can be retrieved by using standard Internet Protocol (IP). The WAP gateway 120 then retrieves the content from the server 140 via transmission 150 that is preferably prepared in WML format, which is optimized for use with WAP clients. If the content is only available in HTML format, the WAP gateway 120 may attempt to translate it into WML, which is then sent on to the WAP client 100 via wireless transmission 160 in such way that it is independent of the mobile operating standard. For a more complete description of WAP architecture and the WAP environment the interested reader may refer to "Wireless Application Protocol Architecture Specification", WAP Forum, Apr. 30, 1998. URL: http://www.wapforum.org/what/technical.htm and "Wireless Application Environment Overview", WAP-195-WAEOverview, Version Mar. 29, 2000, WAP Forum.

FIG. 2 shows the fundamental protocol stack used in the WAP architecture. The protocol stack is comprised of various hierarchical protocol layers that comprise rules that govern traffic and behavior in data transmission. The uppermost layer WAE 200 (Wireless Application Environment) represents a broad application environment depicting the functional operation of services and applications operating at the application level, as shown by reference numeral 205. Below the WAE layer 200 in the hierarchy is the WSP layer 210 (Wireless Session Protocol), which comprises session-related services connected with making browser application requests, for example. The WTP 215 (Wireless Transaction Protocol) layer is involved in operations for reliable data transmission such as interactive browsing, for example. The WTLS layer 220 (Wireless Transport Layer Security) contains optional services that are associated with the security of data transmissions and which may optionally be used by various applications.

The lowermost protocol layer in the WAP protocol stack is the WDP layer 225 (Wireless Datagram Protocol) which operates above the bearers intended for information transmission in a particular network. WDP provides a common interface to the upper protocol layers such that they are able to operate independently of the underlying network. Such networks may include those operating in accordance with the Global System for Mobile Communication (GSM), Time Division Multiple Access (TDMA), Code Division Multiple Access (CDMA), and Wideband Code Division Multiple Access (WCDMA), for example, and are depicted by reference numeral 230. Moreover, bearers of this kind may include short messages (SMS, Short Message Services), data calls (CSD, Circuit Switched Data), packet radio services such as GPRS (General Packet Radio Service), for example.

The WAP system as discussed up until now only describes the retrieval text-based WML content. The next generation of advanced WAP systems will be capable of retrieving multi-modal content that includes sound and video streaming, in addition to text and images, in order to provide sophisticated voice-based and multimedia services. In addition, navigating through content will likely be performed by non-physical interactive techniques such as voice browsing in lieu of the cumbersome method of pressing keypad buttons. Voice browsing techniques require the ability to automatically recognize speech uttered by the user. Automatic speech recognition functioning with the system identifies speech and interprets an associated command for execution of page navigation or selection of links while browsing a Web page, for example. As known to those skilled in the art, mobile phones have typically employed a form of speech recognition in connection with voice dialing whereby users can, for example, say the name of the person they want to call which the phone recognizes and automatically dials the correct number.

As bit rates are increased for advanced generation wireless systems, such as those proposed for use with high bit-rate third generation (3G) systems such as Universal Mobile Telephone Service (UMTS) or even lower bit-rate systems such as High Speed Circuit Switched Data (HSCSD) and GPRS, it will become feasible for mobile users to browse the Internet in a way that approaches that of traditional wireline browsing. This, together with improvements in the WAP architecture, will enable multi-modal content to be accessible for retrieval and playback on mobile clients. This is not possible with the current WAP systems since they, as mentioned, are text-based and do not employ multi-modal capabilities. A further obstacle is that there currently is no established standard in WAP for authoring in multi-modal content.

On the Internet, streaming media is typically transferred or streamed to the receiving computer by a communications protocol known as UDP (User Datagram Protocol). Since IP (Internet Protocol) is packet-based, the packets are transferred in units known as datagrams. As known by those skilled in the art, UDP is a 'connectionless' protocol which uses IP to transmit datagrams while not making sure that all the packets reach their destination. This makes UDP ideal for use in applications where it is not essential for all of the packets to arrive, such as streaming sound files where the occasional lost packets do not make a noticeable difference to the listener.

In the current version of WAP it is possible to use the WDP layer 225 in the protocol stack as a transport mechanism for sound data but there are some disadvantages with this approach, especially when used with automatic speech recognition. A major disadvantage is that it is difficult to ensure absolute security when routing sound data through the WAP gateway. This is because the primary processing for speech recognition in wireless networks can be performed by a separate speech recognition server (SRS) functioning together with the network in what is referred to as a distributed speech recognition system (DSR). DSR is implemented because speech recognition is often too heavy a task to be performed entirely in many mobile clients. This is because speech processing requires a relatively high level of processing power and is memory intensive, especially when implementing multi-language support typically found on many phones today.

Using speech recognition in the WAP environment in the above manner presents risks that are inherent in the routing mechanism. Security concerns may be justified when touting the speech to the SRS for processing via the WAP gateway 120. This can occur when the client encrypts the speech by using the WTLS layer 220 (Wireless Transport Layer Security) in the protocol stack and sends it over a wireless channel to the WAP gateway as the protocol demands. In the gateway it will likely need to be decrypted in order to be sent to and processed by the SRS, where it is then re-encrypted in the gateway and sent on its way. The decryption performed in the gateway leaves the data exposed to a third party (e.g. the network operator) which users may be uncomfortable with particularly when performing sensitive activities such as banking services, for example.

In view of the foregoing, an improved architecture is needed that enables mobile clients to successfully use automatic speech recognition in voice-based interactive applications in a secure manner that requires relatively little modification to existing infrastructures.

SUMMARY OF THE INVENTION

Briefly described and in accordance with an embodiment and related features of the invention, in a method aspect there is provided a speech recognition capable wireless telecommunication system comprising a mobile client in wireless communication with a proxy gateway, a speech recognition server (SRS) that includes a speech recognizer and a text-to-speech (TTS) synthesizer, a method of retrieval and delivery of multi-modal content from a remotely located origin server for presentation and playback on said mobile client comprising the steps of:

sending a request for a Web page from the client to the gateway;

retrieving the Web page from the origin server to the gateway;

returning the Web page to the client;

determining whether the Web page contains multi-modal components;

sending the multi-modal components from the client to the speech recognition server using a wireless packet streaming protocol connection;

obtaining a grammar file or ITS markup strings by the speech recognition server from a remotely located server using an established HTTP network connection from URL references sent from the client;

loading the received grammars in the speech recognizer for performing speech recognition and TTS markup strings into the speech synthesizer for producing synthesized speech; and returning speech recognition results from the speech recognizer and produced synthesized speech to the client over said wireless packet streaming protocol connection.

In a system aspect of the invention, there is provided a wireless telecommunication system comprising a mobile client, a proxy gateway in wireless communication with the mobile client, wherein said gateway hosts an HTTP network connection, and a speech recognition server in wireless communication with the mobile client, the system being characterized in that a wireless packet streaming protocol connection is established between the mobile client and the speech recognition server for the transfer of audio related packet data, and wherein the speech recognition server possesses an HTTP network connection for retrieving grammar and text-to-speech information from a remotely located server.

In a device aspect of the invention, there is provided a mobile client device comprising:
  means for interfacing with a proxy gateway via a data protocol standard;
  means for retrieving a Web page located on an origin server;
  means for extracting multi-modal components from said Web page for transmission to a speech recognition server;
  means for generating speech parameters for use with said speech recognition server; and
  means for establishing a packet streaming protocol connection for wireless communication with said speech recognition server (SRS);

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE INVENTION

Figure 1:
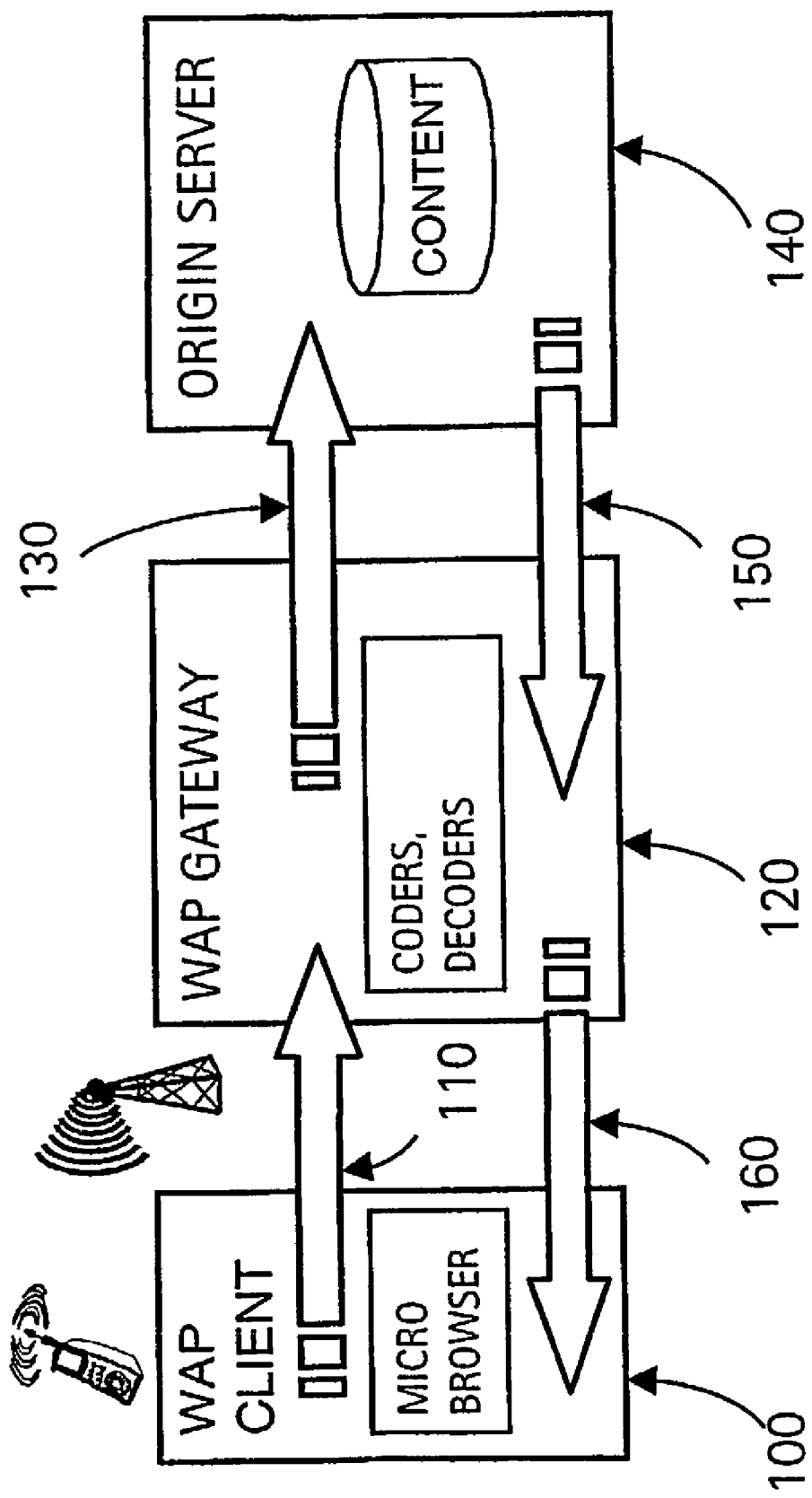
FIG. 1 is an illustration of a basic WAP service model.
Figure 2:
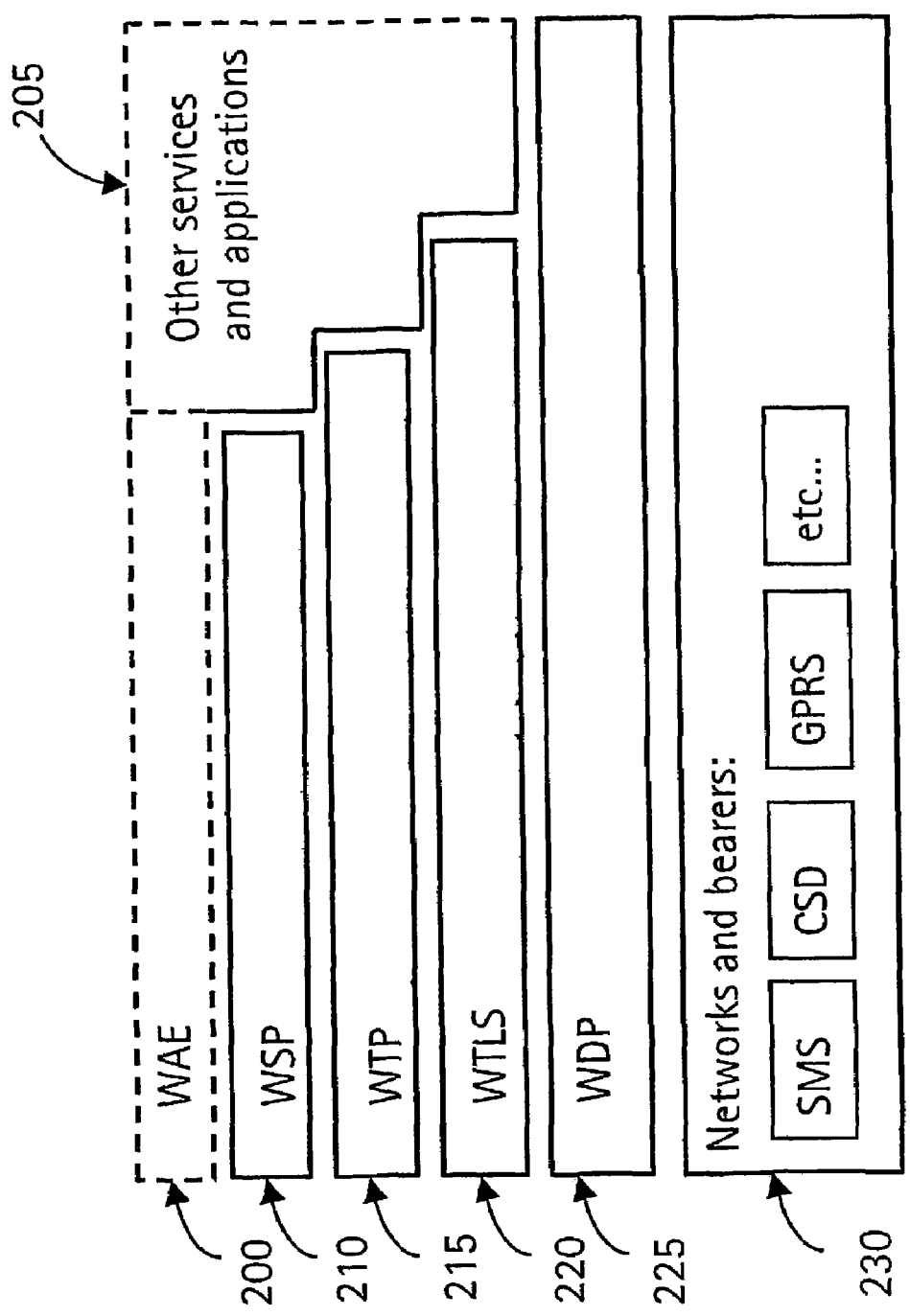
FIG. 2 shows the fundamental protocol stack used in the WAP system.

As discussed in the preceding sections, a mobile client that routes communications bound for the speech recognition server through the WAP gateway suffers from some inherent disadvantages. In addition to the security risk posed by decryption performed in the gateway, a further disadvantage is when a client retrieves a multi-modal content from an origin server, the client needs to make an additional trip through the wireless channel to obtain the associated grammar needed by the speech recognizer. This because the client, when requesting a multi-modal Web page, is unlikely to receive all the multi-modal components referred to from the "main" multi-modal content document in a single response. Although this can depend on the capabilities of the server i.e. Whetter or not it would send a multi-part response. In cases where the multi-modal components are not returned by the initial request, it is necessary to make another trip through the wireless channel to retrieve the referred multi-modal components which decreases performance and slows down response times.

As an example, a client makes a request for a Web page over the wireless channel to the WAP gateway where the gateway locates the page over an HTTP connection for the page residing on the origin server. HTTP refers to Hypertext Transfer Protocol which is a well-known application-level protocol used for distributing hypermedia over the WWW. The page is retrieved and routed back to the client via the gateway where the client discovers that the page is speech recognition capable and therefore must make another trip through the system to retrieve the associated grammar. As known by those skilled in the art, speech recognition systems listen to the user speech to determine what has been said and the grammar is used to determine and limit the vocabulary of what the speech recognizer should listen for. The use of grammars enables recognizers to have reasonable accuracy and response time by reducing the number of misrecognitions resulting from too many possible choices. What users can say is dependent on the context of the Web page and therefore reflected in the associated grammar.

Retrieving the speech grammar associated with the Web page requires another trip over the relatively slow wireless channel and through the WAP system to the origin server and over the wireless channel back to the client. Once the client receives the grammar it must be sent again over a wireless channel to the speech recognition server. The extra trip to get the grammar slows down the speech recognition process and makes inefficient use of spectral resources. The method of the present invention provides a transport mechanism for the grammar and other speech information that substantially improves response times while maintaining the security that is necessary for running confidential voice-based applications. The security is guaranteed by bypassing the WAP gateway in transmitting the speech interaction related data directly between the client and the SRS, given that the SRS is a trusted entity.

Figure 3:
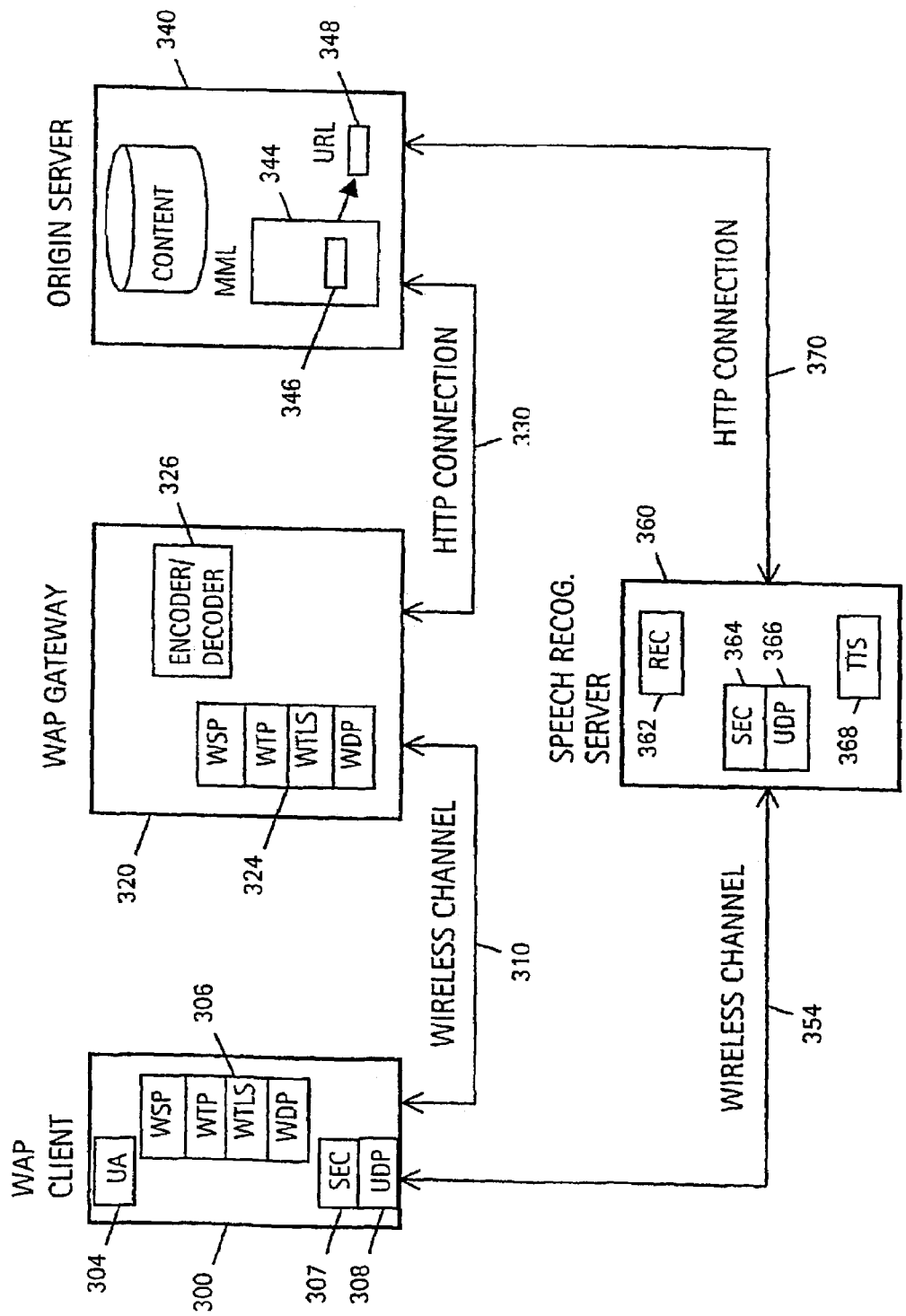
FIG. 3 shows a block diagram of an architecture in accordance with an embodiment of the present invention.

FIG. 3 shows a block diagram of an architecture in accordance with an embodiment of the present invention. The embodiment illustrates the functional connection of components of a system which comprises a WAP client 300 such as a mobile phone, a WAP gateway 320, an origin server 340, and a speech recognition server (SRS) 360. WAP client 300 contains a user agent (UA) 304 i.e. a microbrowser that governs the actions performed by the WAP protocol stack 308. In the wireless session protocol (WSP) layer requests such as "get" and "post", such as in retrieving a web page, are initiated by the UA 304 via wireless channel 310. The request is received by the WAP gateway 320 in accordance with standard WAP protocols. At gateway 320, the transmitted request is decoded by encoder/decoder 326 and the requested universal resource locator (URL) of the Web page is routed to the origin server in accordance with standard HTTP and IP procedures.

The gateway 320 possesses a high speed HTTP connection 330 to the Internet whereby an origin server 340 containing the Web page 344 specified in the request is located. On origin server 340, the Web page 344 may contain multi-modal components such as embedded grammar for speech recognition or a URL referring to such, URLs referring to prerecorded audio, or text-to-speech (TTS) strings (markup) for speech synthesis feedback or their associated URL references. In addition, possible URL references to other media e.g. video, music markup etc. may be included in the content document. Once located, the Web page 344 is routed back via the HTTP connection 330, through gateway 320 and over the wireless channel 310 to client 300.

Not all Web pages on the Internet will be speech enabled but on the ones that are, the client 300 may not receive the associated multi-modal components in response to the initial request. When a requested multi-modal page is received, the client parses the content file and finds that there are references to external grammar and/or TTS markup files that need to be fetched from the Web before being able to present the content to the user. The grammars and TTS strings may be embedded in the page by the Web page designer according to the syntax of what is referred to herein as Multi-modal Markup Language (MML), as indicated by reference numeral 346. MML is a mark up language that is used in constructing Web pages which enable multi-modal interactive functions. In addition, it is possible for Web page designers to construct speech enabled content by using Java Speech Markup Language (JSML) which defines a TTS markup format used by many speech synthesis engines. Furthermore, page designers may use Java Speech Grammar Format (JSGF) which defines a grammar format used by many speech recognition engines for limiting the scope of speech recognition. JSML and JSGF are examples of commonly used content formats for controlling speech synthesis and speech recognition engines. There are however various other speech markup formats that are available to the Web page designer for constructing speech enabled content that work well with the invention.

If the speech content is too large to be reasonably embedded in the page, they may instead be referenced by URL pointers to the locations that contain the grammar and/or TTS markup strings, as indicated by reference numeral 348. The URL locations where the grammar and/or TTS strings reside may be on the same server or another server accessible over the Internet. At this point the embedded grammar and/or TTS strings or, alternatively, the URL pointers to the same are included in the multi-modal content document and returned to the client 300 through the usual path via the WAP gateway 320. Once received by the client, they are transmitted to a Speech Recognition Server (SRS) 360 via wireless channel 354. It should be noted that the wireless channel 354 between client and the SRS 360 is somewhat simplified in that the client actually communicates with a base station in a wireless network (not shown) that is functionally connected to the SRS 360.

The transfer of the grammar and TTS strings from the client to the SRS occur when they are embedded in the document. This may be satisfactory when their size is relatively small, since transfer over the wireless channels (310 and 354) is relatively slow and resource intensive. A better alternative for larger files is for the client 300 to receive URL pointers 348 to the grammars and/or TTS strings which is much less data to send as opposed to sending the complete grammar and/or TTS information. The page designer makes this determination when designing the page. In the case when the SRS 360 receives URLs, the SRS is able to retrieve the files on its own since it possesses a high speed HTTP network connection 370. This results in much more efficient and effective retrieval for large amounts of data that would unnecessarily tax costly spectral resources when sent over a wireless channel.

As known to those familiar with the art, it is possible to construct the grammar for use with speech recognition by parsing the contents of the Web page after it has been received by the client, for example. This is generally performed by searching for certain tags in the markup language of the page that are indicative of certain actions. By way of example, specific tags used in the page construction may designate where items are in the page thereby permitting voice controlled navigation. A grammar can be constructed by deducing from the tags where the page begins/ends or where to find a specific element relating to the first page, for example. Other tags may indicate links where the user can select to follow. In general, grammars constructed by parsing typically yield satisfactory results for basic navigation in relatively simple Web pages but it does not provide the versatility of embedded or referenced grammars which allow programmers to design sophisticated interactive voice-based applications.

With regard to automatic speech recognition, some wireless telecommunication networks employ a distributed speech recognition technique that comprises a front-end process and a back-end process. The front-end process typically involves the capture of user speech when speaking into a mobile phone whereby the real-time speech is converted by digital signal processor into a set of parameters that are characteristic of the speech utterances. The set of parameters are transmitted from the mobile phone over a wireless channel to a separately located speech recognition server (SRS). In the back-end process, the parameters are fed into a speech recognizer that matches them to a known word e.g. by looking for phonemes or sub-words and performing a type of pattern recognition in an attempt to recognize the word.

In the embodiment of the invention, speech parameters and the grammar and/or TTS strings (or URL references to these) in the client 300 are transmitted over wireless channel 354 via an established UDP connection originating from the client UDP port 308. The data is encrypted by a security layer 307 prior to being transmitted. The SRS 360 receives the parameters and the grammar and/or TTS strings via UDP port 366 whereby the encrypted data is decrypted by security layer 364. The received parameters and grammar are input to speech recognizer 362 from where the recognition results are transferred back to the client 300 over the wireless channel 354 using the UDP connection. Furthermore, any received TTS strings are fed into the TTS speech synthesis processor 368 in the SRS. The synthesized speech is sent back to the client 300 for playback to the user over the UDP connection. When URLs are received, the SRS 360 utilizes the high speed network connection 370 to retrieve the large grammar files or TTS strings from the Internet or other network environment. This enables the recognizer to receive the grammars much more quickly than it would over the wireless link thereby speeding up the speech recognition process. Similarly, the speech synthesis process is also sped up by using the high speed network connection to quickly obtain the TTS strings.

Figure 4A:
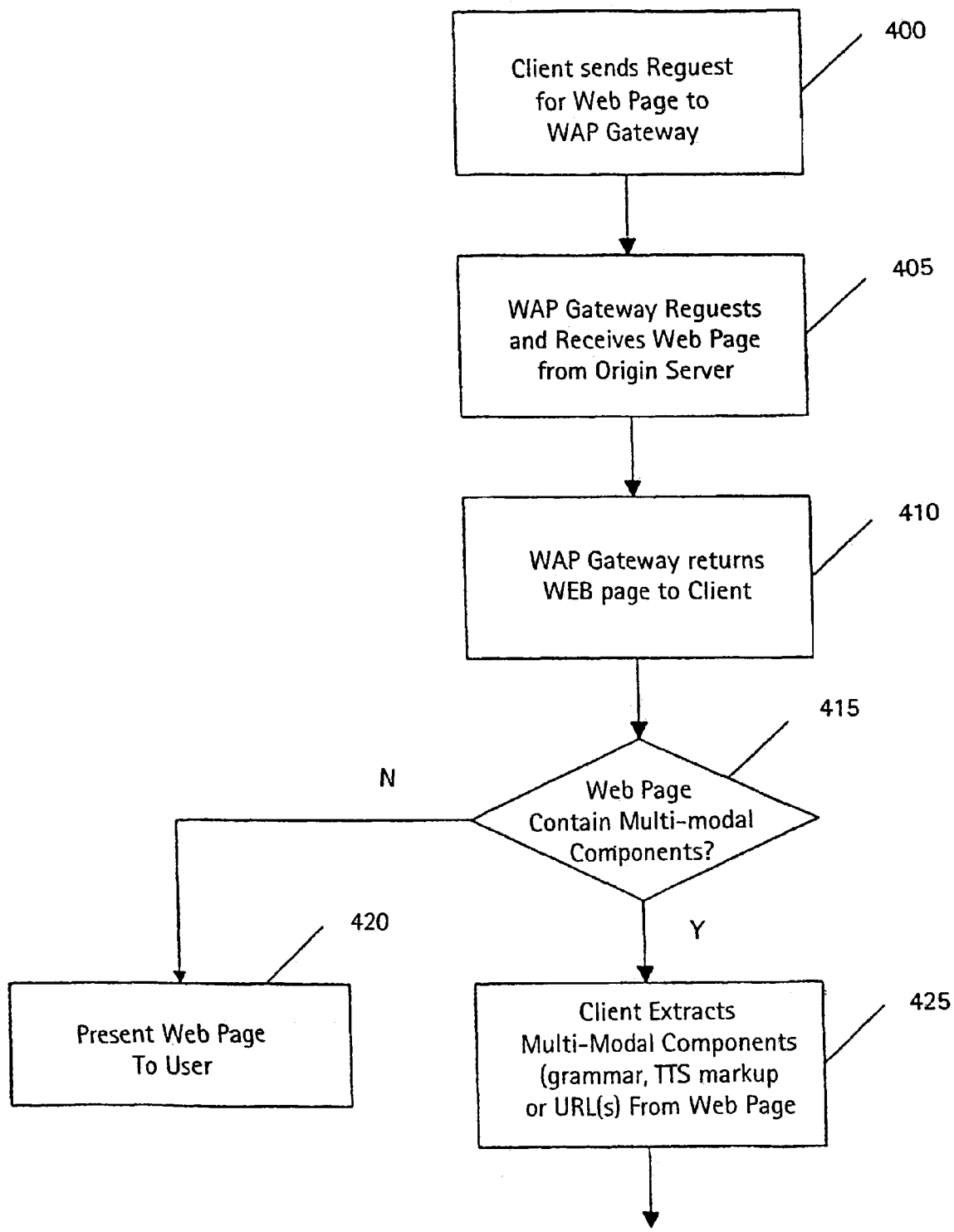
FIGS. 4A and 4B is a flowchart that illustrates a process of retrieving a multi-modal Web page in accordance with the present invention.
Figure 4B:
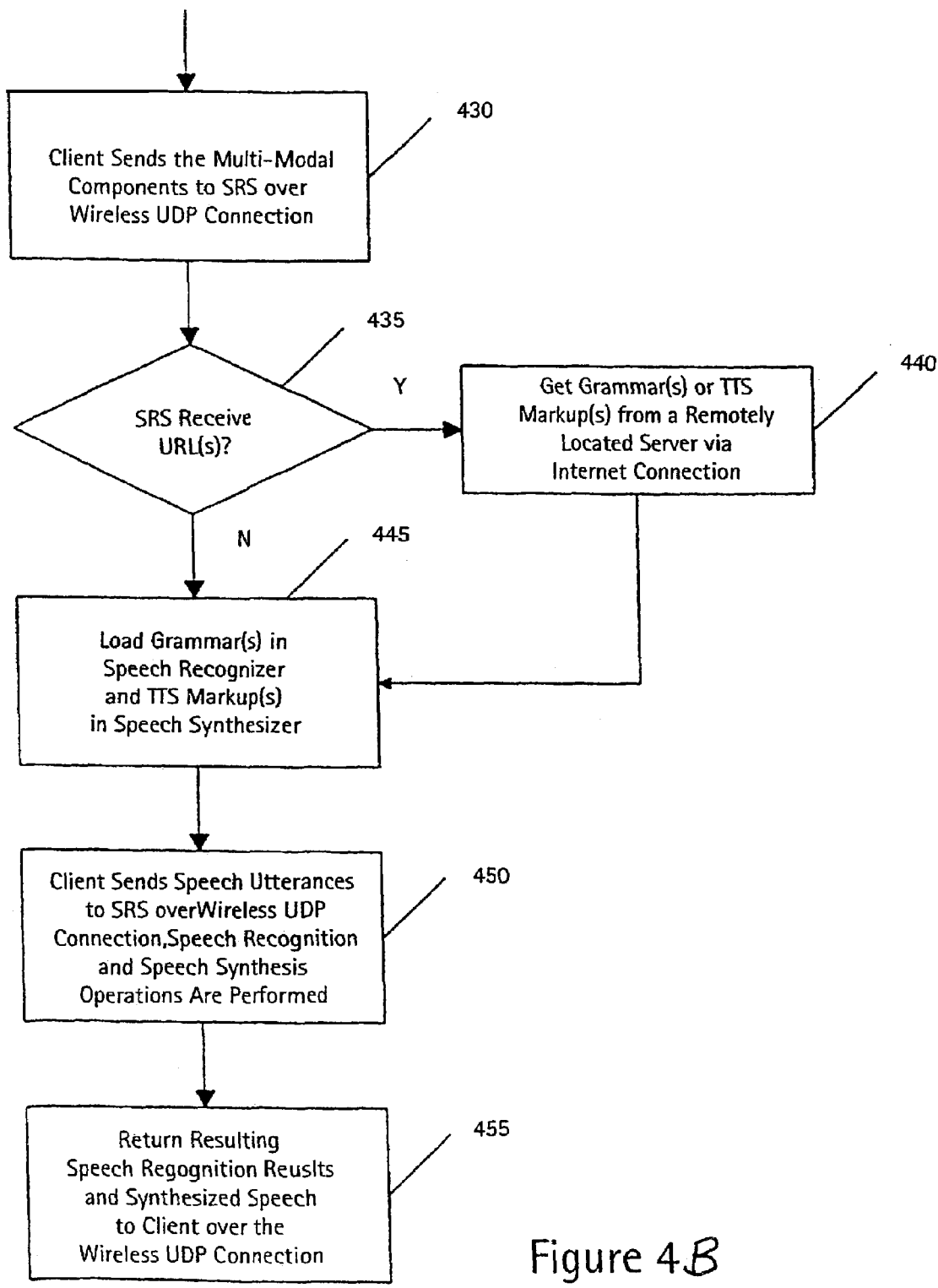

FIG. 4 is a flowchart that illustrates the process of retrieving a multi-modal Web page and associated speech information in accordance with the present invention. At step 400, the client sends a request for a Web page to the WAP gateway over a wireless channel. The gateway, with its connection to the Internet, locates the origin server hosting the Web page from the URL specified in the request and retrieves the page (step 405) where it is then sent to the client, as shown in step 410. It should be noted that a requested page need not be located on the Internet but may be hosted on and retrieved from a WAP server or a Intranet LAN server, for example. Once the Web page is received, the client parses through the content file to determine whether it contains multi-modal components for speech functions, as shown in step 415. If the Web page does not contain speech enabling multi-modal content the page is presented to the user, as shown in step 420. If the Web page is found to contain multi-modal components, the client extracts the multi-modal components such as grammar for speech recognition operations and/or TTS markup for speech synthesis feedback or URLs referring to them from the Web page, as shown in step 425. The extracted components are then sent to the SRS via an established wireless UDP channel in step 430. This channel is also used for sending the speech utterances by the user to the speech server for automatic speech recognition.

In step 435, the speech recognition server (SRS) determines if it received the complete grammar/TTS or reference URL(s). If it received the reference pointers, the grammar and/or TTS information are immediately obtained through its network connection from a remote server, as shown in step 440. In step 445, the received grammar(s) are loaded in the speech recognizer to commence speech processing. The client sends speech utterances to the SRS for use in the speech recognition process over the wireless UDP connection whereby a speech recognition operation is then performed, as shown in step 450. In step 455, the speech recognition result is returned to the client via the established UDP connection. The recognition result may contain error feedback when the recognizer was not successful in recognizing the user utterance and may include a synthesized voice message telling the user to repeat the utterance, for example. Moreover, any received TTS strings are sent to the speech synthesizer (step 445) where a speech synthesis operation is performed (step 450), from which the resulting synthesized speech is returned over the established UDP connection for playback to the user, as shown in step 455.

The timing sequences for sending the synthesized speech from the SRS to the client may be controlled by using the protocol defined for the transmission of speech data over the wireless UDP connection. The timing of the synthesized speech responses are important in providing proper playback of synthesized speech prompts at the appropriate moments in a multi-modal dialog, for example.

One very simple but useful application of speech synthesis would be a Web page that presents relatively constant information such as airline, train or bus schedules or even dynamic information such as weather and stock information, for example. As mentioned earlier, multi-modal Web pages are written in a language referred to herein as Multi-modal Markup Language (MML) in order to enable speech functionality. The application may include what is referred to as TTS markup (such as the earlier mentioned JSML) to implement a synthesized speech response. An application demonstrating text-to-speech functionality such as one that recites a train timetable may be included as part of a larger MML document in which the TTS portion (implemented here using an embedded TTS string) may look something like the following:

```
<mml version="1.0"
    <form>
        <block>Train 446 from Paris to Berlin departs from platform 7 at 16.30 </block>
    </form>
<mml>
```

Where a synthesized voice message of a train leaving from Paris to Berlin from platform 7 at 16.30 is played back when the user selects this timetable, for example. Synthesized speech techniques are continuously improving such that it allows modern synthesized speech to sound quite natural. The improvements will eventually lead to speech synthesizers that produce speech that is virtually indistinguishable from that of a human voice.

Other examples of voice-based applications may include those where the user can make a selection among a list of options by simply uttering the selection. By way of example, a Web page for a restaurant may allow a user to place an order from a menu of items to be delivered to their home. A synthesized voice may recite a list of choices such as Spaghetti, Lasagna, Pizza, or Linguini which prompt the user to make a selection which is submitted to a server script. An exemplary program written in MML may look like the following:

```
<mml version="1.0">
    <form>
        <field name="menu">
        <prompt>Would you like order Spaghetti, Lasagna, Pizza, or Linguini?</prompt>
        <grammar src="http://server.speechcompany.com/services/menu.gram"
        type="application/x-jsgf"/>
        </field>
        <block>
            <submit next="http://www.menu.example/menu2.asp"/>
        </block>
    </form>
</mml>
``` where menu.gram is the grammar to be loaded in the speech recognizer in a technique as described in the present invention. The MML language, used here for example, shares many similarities to VoiceXML (Voice Extensible Markup Language), which is designed for speech-based telephony applications for interactive voice response applications. A more detailed discussion of VoiceXML can be found at: http://www.w3.org/TR/voicexml/ presented by World Wide Web Consortium, W3C.

It is believed that a multi-modal markup language such as MML when standardized should include, in addition to elements found in graphically oriented markup languages such as WML and HTML, support for embedded grammars and URL references thereto and TTS markup and URL references thereto, references to pre-recorded audio files in various formats, and references to alternative media such as video formats, music markup formats etc. Moreover, the functionality of the SRS may be extended to generating music from the markup, encoding (compressing) pre-recorded speech prompts and music clips for efficient transmission to the client over the UDP connection, etc.

Although the invention has been described in some respects with reference to a specified embodiment thereof, variations and modifications will become apparent to those skilled in the art. In particular, the inventive concept may be applied to wireless packet-based environments other than WAP such as I-mode, for example. It is therefore the intention that the following claims not be given a restrictive interpretation but should be viewed to encompass variations and modifications that are derived from the inventive subject matter disclosed.

The invention claimed is:

1. A method comprising:
   sending a request for a Web page from a mobile client to a gateway, wherein the mobile client is in wireless communication with the gateway;
   retrieving the Web page from an origin server to the gateway;
   returning the Web page to the client;
   determining whether the Web page contains multi-modal components;
   sending a multi-modal components from the client to a speech recognition server using a direct wireless packet streaming protocol connection, wherein the speech recognition server includes a speech recognizer and a text-to-speech synthesizer;
   obtaining a grammar file or text-to-speech markup strings by the speech recognition server from a remotely located server using an established hypertext transport protocol network connection from at least one universal resource locator references sent from the client;
   loading the received grammars in a speech recognizer for performing speech recognition and text-to-speech markup strings into the speech synthesizer for producing synthesized speech; and
   returning speech recognition results from the speech recognizer and produced synthesized speech to the client over said wireless packet streaming protocol connection.

2. The method according to claim 1, wherein said wireless telecommunication system operates in accordance with Wireless Application Protocol.

3. The method according to claim 1, wherein the multi-modal components include grammar, text-to-speech markup strings, pre-recorded audio, video, or music markup, or universal resource locator references of any of those mentioned.

4. The method according to claim 3, wherein the grammar and text-to-speech markup strings are embedded in the Web page.

5. The method according to claim 1, wherein the wireless packet streaming protocol connection is a wireless user datagram protocol connection.

6. An apparatus comprising:
   a processor configured to control operations of the apparatus; and
   memory storing executable instructions that, when executed by the processor, cause the apparatus to perform:
      interfacing with a proxy gateway via a data protocol standard to retrieve a Web page located on an origin server;
      extracting multi-modal components from said Web page for transmission to a speech recognition server;
      generating speech parameters for use with said speech recognition sewer;
      establishing a direct wireless packet streaming protocol connection for wireless communication with said speech recognition server;
      sending the multi-modal components to the speech recognition server using the established direct wireless packet streaming protocol connection; and
      receiving speech recognition results and produced synthesized speech from the speech recognition server via said wireless packet streaming protocol connection.

7. The apparatus according to claim 6, wherein the data protocol standard is Wireless Application Protocol.

8. The apparatus according to claim 6, wherein said multi-modal components includes any one of grammar, text-to-speech markup strings, pre-recorded audio, video, or music markup, or URL references of any of those mentioned.

9. The apparatus according to claim 6, wherein the generated speech parameters in the client are used together with a distributed speech recognition system comprising a remote speech recognition server.

10. The apparatus according to claim 6, wherein the packet streaming protocol connection is a wireless user datagram protocol connection.

11. An apparatus, comprising:
    a processor configured to control operations of the apparatus: and
    memory storing executable instructions that, when executed by the processor, cause the apparatus to perform:
       establishing a direct wireless packet streaming protocol connection with a mobile client;
       receiving multi-modal components from the client via the established direct wireless packet streaming protocol connection;
       obtaining a grammar file or text-to-speech markup strings from a remotely located server using an established hypertext transport protocol network connection from at least one universal resource locator reference sent from the mobile client;
       loading the received grammars in a speech recognizer for performing speech recognition and text-to-speech markup strings into the speech synthesizer for producing synthesized speech; and
       returning speech recognition results from the speech recognizer and produced synthesized speech to the mobile client over the said wireless packet streaming protocol connection.

12. The apparatus according to claim 11, wherein the wireless packet streaming protocol connection is a wireless user datagram protocol connection.

13. The apparatus according to claim 12, wherein the mobile client and apparatus each possesses a user datagram protocol port and associated hardware and software to facilitate communication via a wireless user datagram protocol connection.

14. The apparatus according to claim 11, wherein the speech recognition server further comprises:
    a speech recognizer, a text-to-speech processor, and security hardware and software for ensuring the secure transfer of communications data.

15. The apparatus according to claim 11, wherein the hypertext transport protocol network connection is a high speed Internet connection.

* * * * *